United States Patent
Gaurav et al.

(10) Patent No.: US 7,624,122 B2
(45) Date of Patent: Nov. 24, 2009

(54) METHOD AND SYSTEM FOR QUERYING A DATABASE

(75) Inventors: Vishal Gaurav, Bokaro Steel (IN); Dietmar Storz, Heidelberg (DE); Manoj Gupta, West Bengal (IN); Erik Luengen, Flein (DE)

(73) Assignee: SAP AG, Walldorf (DE)

( * ) Notice: Subject to any disclaimer, the term of this patent is extended or adjusted under 35 U.S.C. 154(b) by 249 days.

(21) Appl. No.: 11/626,867

(22) Filed: Jan. 25, 2007

(65) Prior Publication Data

US 2008/0183741 A1   Jul. 31, 2008

(51) Int. Cl.
  G06F 7/00   (2006.01)
  G06F 17/00  (2006.01)
  G06F 17/30  (2006.01)
(52) U.S. Cl. .......................................... 707/102; 707/4
(58) Field of Classification Search ................. 707/102, 707/4
See application file for complete search history.

(56) References Cited

U.S. PATENT DOCUMENTS

| | | | |
|---|---|---|---|
| 5,515,488 A | 5/1996 | Hoppe et al. | |
| 6,189,004 B1 * | 2/2001 | Rassen et al. | 707/3 |
| 6,738,077 B1 * | 5/2004 | Wendker et al. | 715/744 |
| 6,772,150 B1 | 8/2004 | Whitman et al. | |
| 7,096,229 B2 | 8/2006 | Dettinger et al. | |
| 7,194,692 B2 * | 3/2007 | Marcos et al. | 715/744 |
| 2005/0278286 A1 | 12/2005 | Djugash et al. | |
| 2006/0265344 A1 | 11/2006 | Woods | |
| 2008/0104082 A1 | 5/2008 | Gimson et al. | |

* cited by examiner

*Primary Examiner*—Shahid A Alam
*Assistant Examiner*—Alexey Shmatov

(57) ABSTRACT

A method and system for querying a database are provided. A user interface element for a dynamic field is created wherein the user interface element comprises a name field and a value field. A generic query structure is provided wherein the generic query structure comprises an attribute pair. The attribute pair has a field name attribute and a field value attribute. The name field is bound to the field name attribute and a first entry from the name field is passed to the field name attribute. The value field is then bound to field value attribute and a second entry from the value field is passed to the field value attribute.

17 Claims, 6 Drawing Sheets

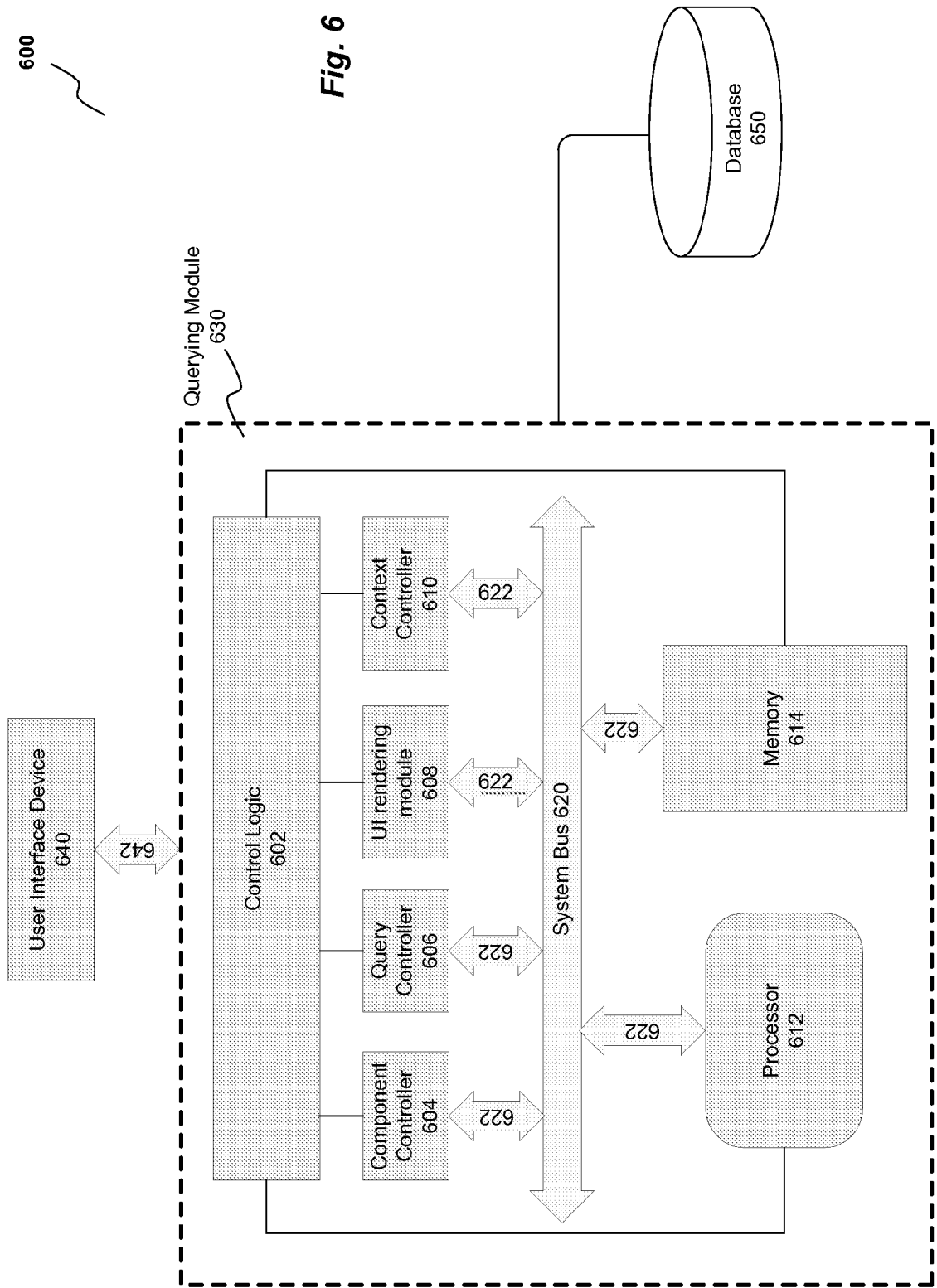

METHOD AND SYSTEM FOR QUERYING A DATABASE

TECHNICAL FIELD

Embodiments of the invention generally relate to computer systems, and more particularly, to a method and system for querying a database.

BACKGROUND

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. The database may include a relational database.

Retrieval of information from a database is typically done using queries. A query usually specifies conditions that apply to one or more columns of the database, and may specify relatively complex logical operations on multiple columns. The database is searched for records that satisfy the query, and the records are returned as a query result.

Graphical query interfaces have been developed that help a user to query a database. One problem with the existing graphical query interfaces is that a user who does not have detailed knowledge of the database relationships may define a query that could return millions of records, or could define a query that returns no records. As a result, the user may spend time building a query only to find out after executing the query that the query did not return the desired data. The user must then guess at what changes to make to the query so that it returns the desired data.

Some graphical querying interfaces list all available columns in a database from which the user may select one or more columns to build up a query. The user may also select a field in a column to further refine the query conditions. Building a query by selecting columns and records is a very tedious and time consuming process especially when the database being queried is very large and contains hundreds of columns and thousands of records.

Thus the prior art teaches the generation of queries by a tedious and time consuming process that is not terribly useful because it returns a dataset that may be too large or too small.

SUMMARY OF THE INVENTION

Embodiments of the invention are generally directed to a method and system for querying a database. A user interface element for a dynamic field is created wherein the user interface element comprises a name field and a value field. A generic query structure is provided wherein the generic query structure comprises an attribute pair. The attribute pair has a field name attribute and a field value attribute. The name field is bound to the field name attribute and a first entry from the name field is passed to the field name attribute. The value field is bound to the field value attribute and a second entry from the value field is passed to the field value attribute.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

FIG. 6 is a block diagram of a system useful for implementing the invention according to an embodiment of the invention.

DETAILED DESCRIPTION

Embodiments of the invention are generally directed to a method and system for querying a database. A user interface element for a dynamic field is created wherein the user interface element comprises a name field and a value field. A generic query structure is provided wherein the generic query structure comprises an attribute pair. The attribute pair has a field name attribute and a field value attribute. The name field is bound to the field name attribute and a first entry from the name field is passed to the field name attribute. The value field is bound to the field value attribute and a second entry from the value field is passed to the field value attribute.

Figure 1:
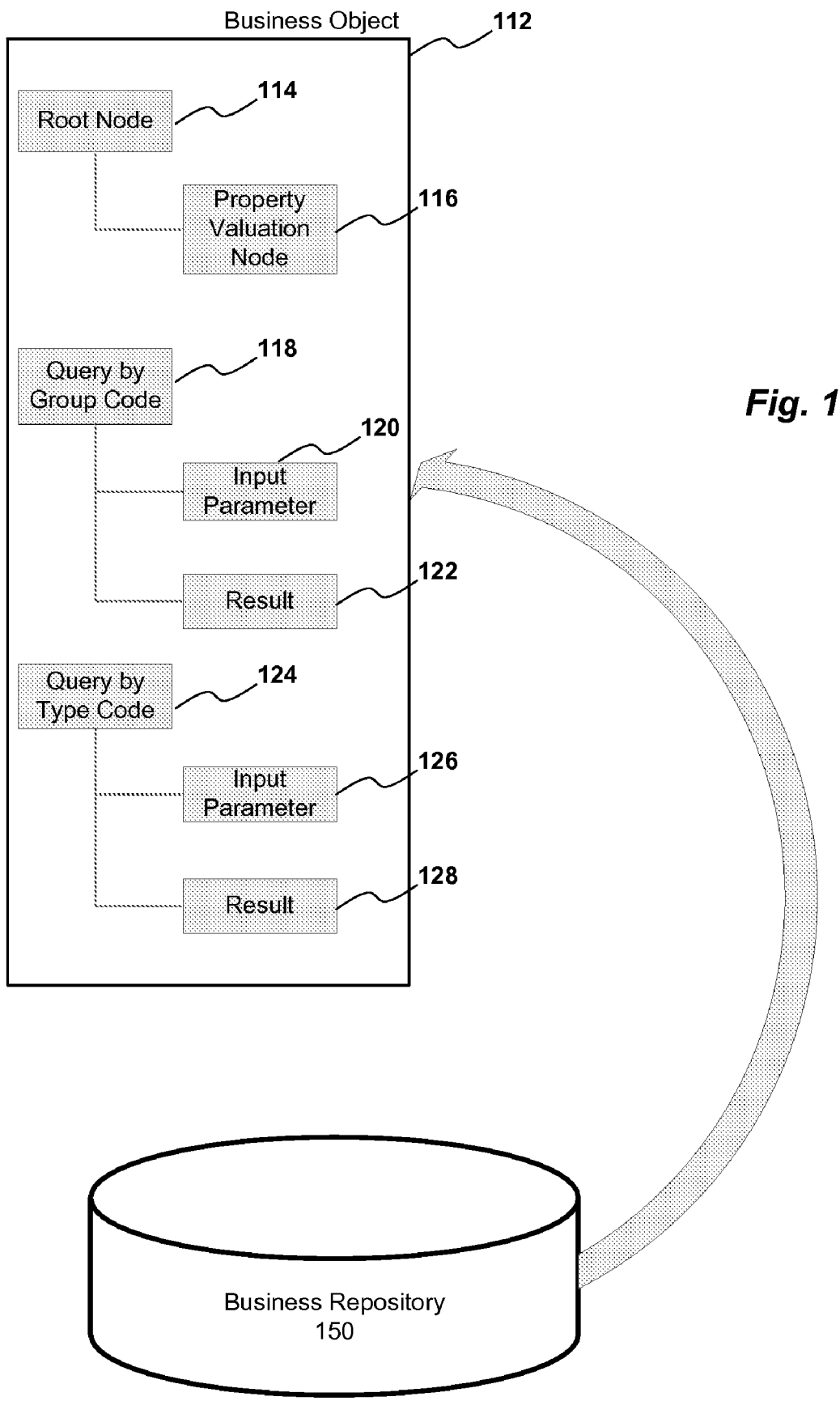
FIG. 1 is an example business object according to an embodiment of the invention.

FIG. 1 is an example business object 112 according to an embodiment of the invention. Business repository 150 typically stores business object 112. Business object 112 generally includes root node 114, query by group code (QGC) 118 and query by type code (QTC) 124. Root node 114 typically provides a structure in which querying results are stored. More particularly root node 114 provides a structure for storing querying results that are generated by executing query by group code 118 or query by type code 124. Root node 114 typically includes property valuation node 116 as an associated node. Property valuation node 116 generally provides a structure for storing results relating to dynamic fields.

Query by group code 118 typically includes input parameter node 120 and result node 122 as associated nodes. Input parameter node 120 generally provides a structure for query conditions upon which a search may be conducted. Result node 122 generally provides a structure for storing results that are generated by executing query by group code 118. In one embodiment of the invention the structure of result node 122 is same as the structure of root node 114. Query by group code 118 is typically used to retrieve metadata for one or a group of condition types.

Query by type code 124 typically includes input parameter node 126 and result node 128 as associated nodes. Input parameter node 126 generally provides a structure for storing query conditions upon which a search may be conducted. Result node 128 generally provides a structure for storing results that are generated by executing query by type code 124. In one embodiment of the invention the structure of result node 128 is same as the structure of root node 114. Query by type code 124 is typically used for searching a database based upon user defined conditions and retrieve results.

Figure 2:
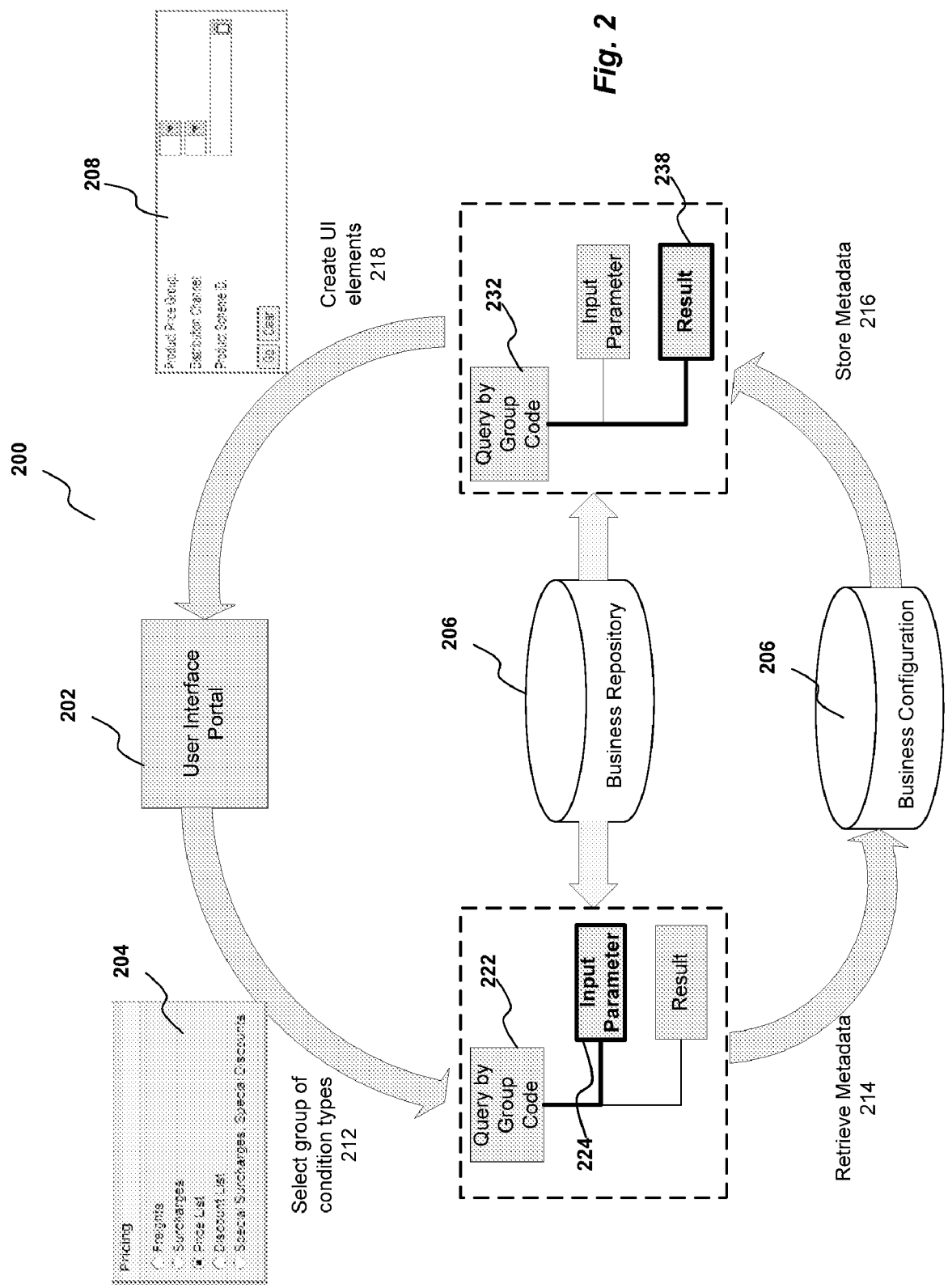
FIG. 2 is a process flow diagram for querying a database according to an embodiment of the invention.

FIG. 2 is a process flow diagram 200 for querying a database according to an embodiment of the invention. Business configuration 206 stores a number of condition types. According to one embodiment of the invention a condition type generally includes a number of fields, each field being associated with a column of a table stored in a database. Each field of a condition type is typically a semantic key. Each condition type typically relates to a table in the database. The semantic keys of a condition type may include one or more static keys and one or more dynamic keys. The static keys are usually common across all condition types. A set of dynamic keys is typically unique for a condition type. A user may dynamically generate input fields for the dynamic keys and enter values in the input fields to specify search conditions to query a database. The user typically builds a query by specifying various logical conditions between the semantic keys of a condition type. The query is then used to search and retrieve desired results from the database. The logical conditions between the fields of a condition type may be Boolean conditions such as AND, OR, NOT, XOR or XNOR. The user may create and configure user created condition types based upon the search requirements and store the user created condition types and the corresponding tables in business configuration 206 or choose from a standard set of condition types provided by an application vendor.

According to an embodiment of the invention, user interface portal 202 enables a user to select one or more condition types including user created condition types from selectable list 204 of condition types. Each option from selectable list 204 of condition types may retrieve metadata relating to one or a group of condition types. Responsive to the user selecting one or a group of condition types 212 from selectable list 204, the user selection is passed on as input parameters to input parameter node 224 of query by group code 222. Query by group code 222 is then executed to search business configuration 206 based upon the input parameters. The metadata of the semantic keys belonging to the selected condition types is retrieved 214 as a result and stored 216 in result node 238 of query by group code 232. In one embodiment of the invention the metadata for each semantic key is stored as a separate record in result node 238. The metadata for each field of a condition type may include a user interface type, name of the field, type of field, label of field, tool tip or sync code. According to one embodiment of the invention the structure of result node 238 is same as the structure of root node 232. Thus result node 238 may have a root node and a property valuation node as an associated node. Root node of result node 238 typically stores metadata for the static keys and the property valuation node of result node 238 stores metadata for the dynamic keys. User interface elements 208 are generated 218 for all the semantic keys of the selected condition type from the retrieved metadata stored in result node 238 and displayed to the user in user interface portal 202.

Generation of user interface elements 208 typically includes dynamically creating a form having input fields for each semantic key and push buttons for performing tasks and dynamically associating the push buttons with actions. A context is typically created for session maintenance so that same data need not be retrieved repeatedly at the change of each user screen in user interface portal 202. The tasks for which push buttons are created include clearing the fields, saving a query, deleting a query, modifying a query and initiating a search based upon the values of the semantic keys. The push buttons may be associated with actions such as mouse click or press of a button on a key board. A user may enter values in each of the created input fields to build up a query and search the database to retrieve the desired results.

Query by group code 222, 232 may either be used directly from business repository 206 or an instance of query by group code 222, 232 may be created and maintained in the context. The instance of query by group code 222, 232 may then be used for querying and result retrieval purposes. A separate instance of query by group code 222, 232 may be generated every time the user selects one or a group of condition types from selectable list 204. Alternatively, a single instance of query by group code 222, 232 may be maintained in the context and reused for multiple user selections.

Figure 3:
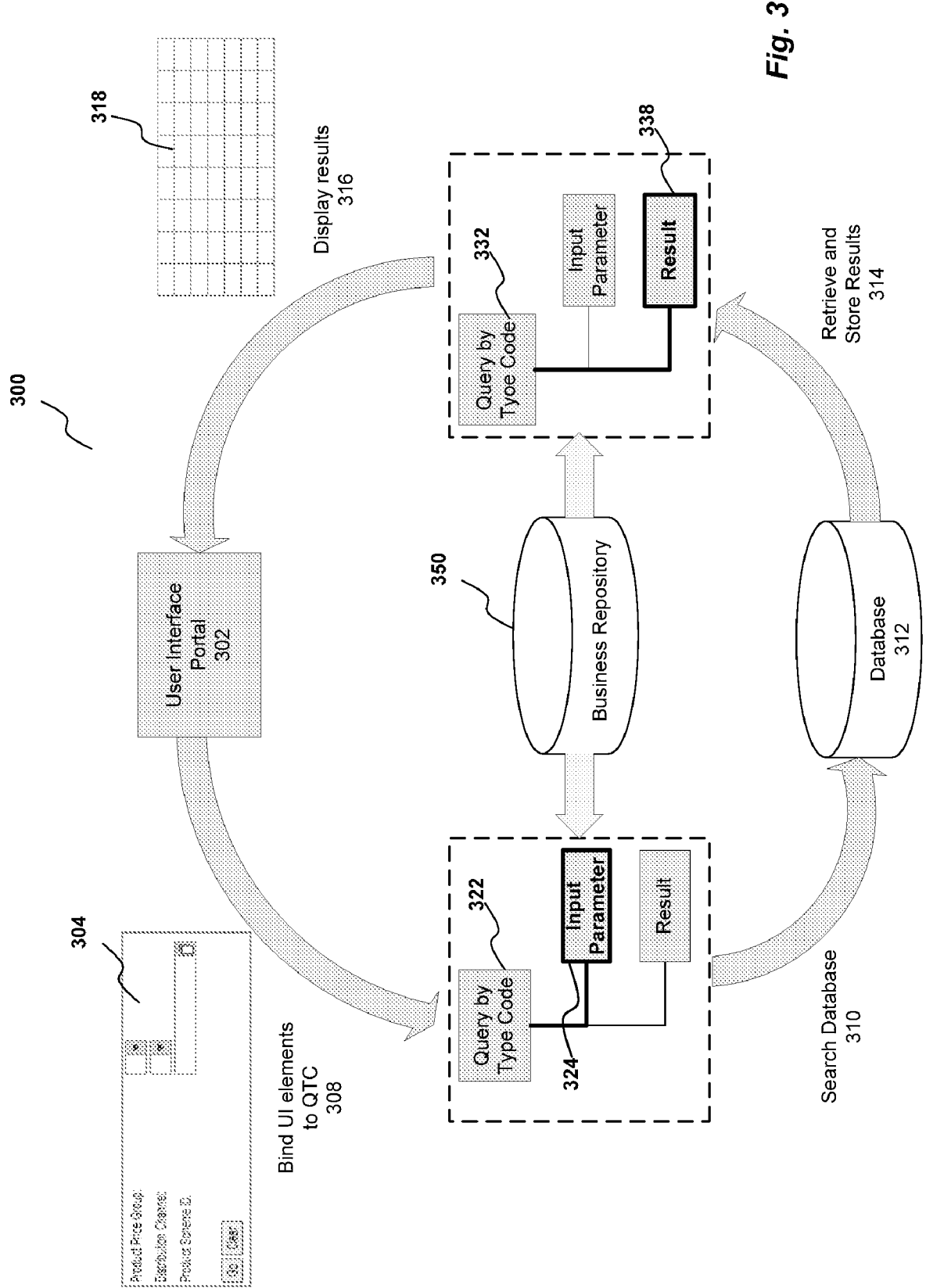
FIG. 3 is a process flow diagram for querying a database according to an embodiment of the invention.

FIG. 3 is a process flow diagram 300 for querying a database according to an embodiment of the invention. As already indicated in the previous section, user interface elements 304 are generated for all the semantic keys of the selected condition type from the retrieved metadata stored in result node 112 of query by group code 118 and displayed to the user in user interface portal 302. The semantic keys and the corresponding values of each semantic key as entered by a user in the input fields are passed on 308 as input parameters to input parameter node 324 of query by type code 322. Query by type code 322 is then executed to initiate a search 310 in database 312 based upon the input parameters. Search results are retrieved 314 from database 312 and stored in result node 338 of query by type code 332. The retrieved results are then processed and displayed 316 to the user in required format 318 through user interface portal.

Query by type code 322, 332 may either be used directly from business repository 350 or an instance of query by type code 322, 332 may be created and maintained in the context. The instance of query by type code 322, 332 may then be used for querying and result retrieval purposes. A separate instance of query by type code 322, 332 may be generated every time the user selects one or group of condition types from the selectable list. Alternatively, a single instance of query by type code 322, 332 may be maintained in the context and reused for multiple user selections.

Figure 4:
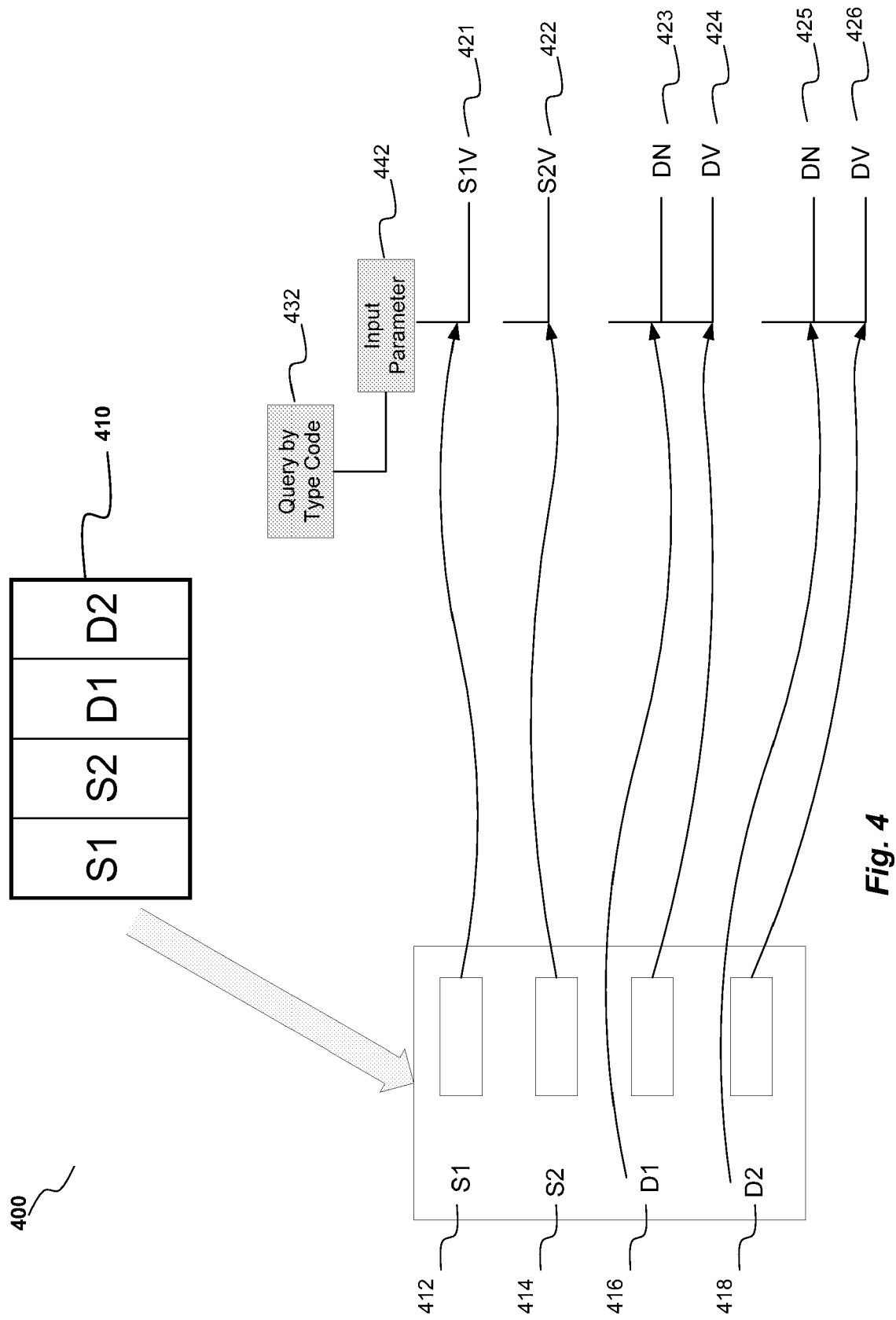
FIG. 4 illustrates the binding of user interface elements to a generic structure of query by type code according to an embodiment of the invention.

FIG. 4 illustrates the binding of user interface elements to a generic structure of query by type code 432 according to an embodiment of the invention. Input parameter node 442 of query by type code 432 typically includes a number of attributes with each attribute storing an input parameter for a static key or a dynamic key. The input parameter node 442 generally includes one attribute for each static key and an attribute pair for each dynamic key. As the set of dynamic keys for each condition type are unique, the attribute pair for dynamic keys typically includes a dynamic key name attribute and a dynamic key value attribute. This enables query by type code to be used to query the database based upon dynamic keys of more than one condition type. Since the static keys are common across all condition types, there is no need for a static key name attribute. Thus the attribute for static key is typically a static key value attribute. The number of attributes in input parameter node 442 may vary depending upon the range of condition types available to a user for querying a database.

Condition type 410 includes two static keys S1, S2 and two dynamic keys D1, D2. Assuming that a user selects condition type 410, user interface elements 412 for S1, 414 for S2, 416 for D1 and 418 for D2 are generated and displayed to the user. The user interface elements 412, 414, 416, 418 include the semantic key names and a corresponding input fields for each semantic key. The user interface elements 412, 414, 416, 418 are then bound to the attributes of input parameter 126. The input field for semantic key S1 is bound to static key value attribute (S1V) 421 and the input field for semantic key S2 is bound to static key value attribute (S2V) 422. The user interface elements 416 and 418 each are bound to attribute pairs. The dynamic key name D1 is bound to dynamic key name attribute (DN) 423 and the input field for D1 is bound to dynamic key value attribute (DV) 424. Similarly, the dynamic key name D2 is bound to dynamic key name attribute (DN) 425 and the input field for D2 is bound to dynamic key value attribute (DV) 426. As the user enters values in the input fields for each static key or dynamic key, the values are passed on to the corresponding dynamic key value attribute or static key value attribute as input parameters. The user may specify logical conditions between the dynamic key attribute pairs to build the required query. In addition, the user may also choose to ignore one or more of the semantic keys and choose to build a query based only upon few of the semantic keys of the selected condition type. Query by type code 432 may then be executed to retrieve results based upon the input parameters.

The user interface elements for the dynamic keys may not be bound to the dynamic key attribute pairs in sequential order. Each dynamic key attribute pair may be assigned a type based upon the available types of dynamic keys. Thus user interface elements of a dynamic key may be bound to only those attribute pairs with matching dynamic key types. The dynamic key types may include data type, code type, identifier type and the like.

Figure 5:
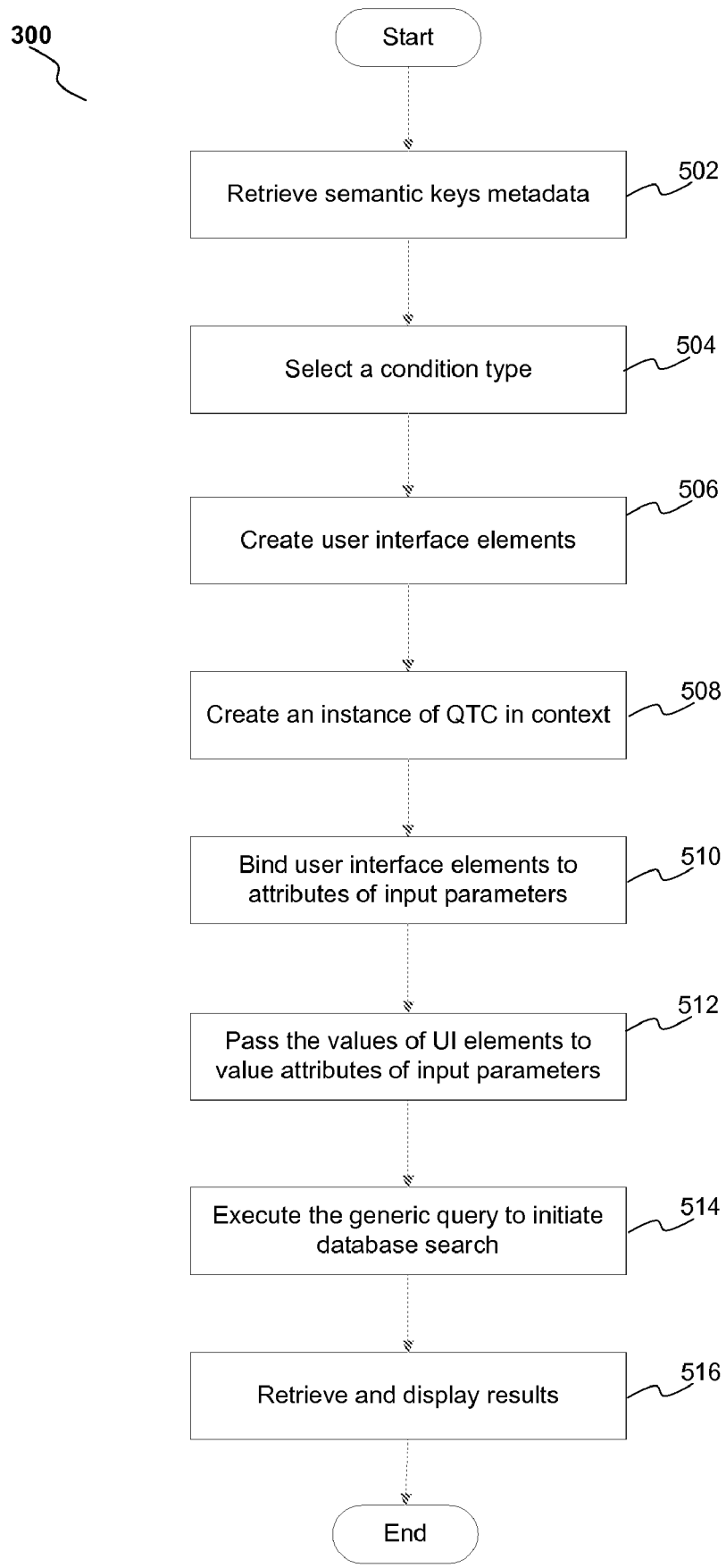
FIG. 5 is a flow diagram of a process for querying a database according to an embodiment of the invention.

FIG. 5 is a flow diagram of a process 500 for querying a database according to an embodiment of the invention. In process block 502, metadata of the semantic keys of a selected group of condition types is retrieved. The metadata is retrieved by executing a query by group code. The metadata is then stored as result in a result node of the query by group code. In process block 504, a condition type of the one or more retrieved condition types is selected by a user. Responsive to the selection of the condition type, user interface elements are generated in process block 506. Process 500 then moves to process block 508, wherein an instance of a query by type code is generated and stored in the context. In process block 510, the user interface elements are bound to the attributes of an input parameter node of the query by type code. In process block 512, values entered in the input fields by the user are passed on to the input parameters. Process 500 then moves to process block 514, wherein the query by type code is executed to initiate a search in a database based upon the input parameters. In process block 516, the results of the search are retrieved and displayed to the user through a user interface portal.

FIG. 6 is a block diagram of a system 600 useful for implementing the invention according to an embodiment of the invention. Querying module 630 is connected to a user interface device 640 through bus 642. User interface device 640 may be used by a user to select one or more condition types and to enter values in the input fields meant for static and dynamic keys to specify the search conditions. Querying module 630 carries out the search in database 650 and displays the results of the search in user interface device 640. Querying module 630 includes component controller 604, query controller 606, user interface rendering module 608, context controller 610, processor 612, memory 614 and control logic 602 all connected to a system bus 620 through busses 622. A business repository having a business object structure and a business configuration having a number of condition types are typically stored in memory 614. User interface device 640 enables a user to select one or more condition types including user created condition types from a selectable list of condition types. Responsive to the user selecting one or a group of condition types from the selectable list, an instance of a query by group code is created by component controller 604 and stored in memory 614. Component controller 604 passes the user selection as input parameters to an input parameter node of the query by group code. The query by group code 118 is then executed by component controller 604 to search the business configuration based upon the input parameters. Component controller 604 retrieves the metadata of the semantic keys as a result and stores the result in memory 614. User interface elements are generated by user interface rendering module 608 for all the semantic keys of the selected condition type from the retrieved metadata and displayed to the user through user interface device 640. A context is typically created by context controller 610 and stored in memory 614.

Query controller 606 creates an instance of a query by type code and stores in memory 614. Query controller 606 binds semantic keys and the corresponding input fields of each semantic key to the attributes of the input parameter node. Query controller 606 then passes the semantic key names and the values as entered by a user in the input fields to the corresponding attributes as input parameters. Query controller 606 then executes the query by type code 124 to initiate a search in database 650 based upon the input parameters. Search results are retrieved from database 650 and stored in memory 614. The retrieved results are then processed and displayed to the user in required format through user interface device 640. The According to an embodiment of the invention system 600 runs on a processor 612. According to another embodiment of the invention control logic 602 provides timing and control signals all components of system 600.

The particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DYD ROMs, RAMs, EPROMs, EEPROMs, magnetic or optical cards, other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method for creating a user interface element to query a database, the method comprising:
   from a query specifying user interface, receiving a user selection of a condition type for querying a business object associated with the condition type;
   in response to the user selection, identifying an instance of query by group code that is adapted to search for metadata associated with the condition type;
   executing the identified instance of the query by group code to retrieve the metadata associated with the condition type;
   based upon the retrieved metadata, adapting the query specifying user interface to create a query specifying user interface element to query for the objects associated with the condition type, by adding at least one static key and at least one dynamic key;
   based upon the adapted query specifying user interface element, generating a generic query structure of a query by type code associated with the condition type, the generic query structure including a static field value attribute and a dynamic attribute pair, the dynamic attribute pair having a dynamic field name attribute and a dynamic field value attribute;
   binding the user interface element to the generic query structure of the query by type code, by binding the static key of the user interface element to the static field value attribute of the generic query structure, and binding the dynamic key of the user interface element to the dynamic attribute pair of the generic query structure; and
   passing a value entered in the static value field of the static key to the static field value attribute of the generic query structure, passing a value of the dynamic name field of the dynamic key to the dynamic field name attribute of the generic query structure, passing a value entered in the dynamic value field of the dynamic key to the dynamic value field attribute of the generic query structure, and based upon the values entered in the static key and the dynamic key of the user, building a query for querying the business object.

2. The computer implemented method of claim 1, wherein the generic query structure comprises a group of attribute pairs, attribute pairs are grouped based upon a type of dynamic input field.

3. The computer implemented method of claim 1 further comprising:
   passing a value entered in the static value field of the static key to the static field value attribute of the generic query structure,
   passing a value of the dynamic name field of the dynamic key to the dynamic field name attribute of the generic query structure,
   passing a value entered in the dynamic value field of the dynamic key to the dynamic value field attribute of the generic query structure, and
   based upon the values entered in the static key and the dynamic key of the user, building a query for querying the business object.

4. The computer implemented method of claim 3, wherein building the query comprises applying logical conditions between one or more user interface elements, the user interface elements comprising the static key and the dynamic key.

5. The computer implemented method of claim 1, wherein identifying the query by group code comprises identifying an instance of the query by group code, the instance of the query by group code created based upon metadata of a selected condition type.

6. The computer implemented method of claim 1, wherein generating the generic structure of the query by type code comprises generating the generic query structure of an instance of the query by type code, the instance of the query by type code created based upon metadata of a selected condition type.

7. The computer implemented method of claim 1, wherein binding the static key of the user interface element to the static value attribute of the generic query structure comprises binding the static value field of the static key of the user interface element to the static value attribute of the generic query structure.

8. The computer implemented method of claim 1, wherein binding the dynamic key of the user interface element to the dynamic attribute pair of the generic query structure comprises binding the dynamic name field of the user interface element to the dynamic field name attribute of the generic query structure, and binding the dynamic value field of the user interface element to the dynamic value field attribute of the generic query structure.

9. A computing device operable for creating a query specific user interface to query a database, comprising:
   a query specifying user interface receiving a selection of a condition type for querying a business object associated with the condition type;
   a component controller identifying an instance of a query by group code that is adapted to search metadata associated with the condition type, and executing the identified instance of the query by group code to retrieve the metadata associated with the selected condition type;
   a user interface rendering module adapting the query specifying user interface to create a query specifying user interface element based upon the metadata retrieved by the component controller, the user interface element including at least one static key and at least one dynamic key;
   a memory coupled to the user interface rendering module, the memory storing a business repository, the business repository generating a generic query structure of a query by type code associated with the condition type, the generic query structure including a static field value attribute and a dynamic attribute pair, the dynamic attribute pair having a dynamic field name attribute and a dynamic field value attribute; and
   a query controller coupled to the memory and the user interface rendering module, the query controller binding the user interface element to the generic query of the query by type code, by binding the static key of the user interface element to the static field value attribute of the generic query structure, binding the dynamic key of the user interface element to the dynamic attribute pair of the generic query structure and passing a value entered in the static value field of the static key to the static field value attribute of the generic query structure, passing a value of the dynamic name field of the dynamic key to the dynamic field name attribute of the generic query structure, passing a value entered in the dynamic value field of the dynamic key to the dynamic value field attribute of the generic query structure, and based upon the values entered in the static key and the dynamic key of the user, building a query for querying the business object.

10. The computing device of claim 9 further comprising a control logic coupled to the system, providing timing and control signals to the entire system.

11. The computing device of claim 9, wherein the user interface rendering module, the memory and the query controller are connected to a system bus.

12. The computing device of claim 9 further comprising a context controller coupled to the memory:
   the context controller identifying an instance of the query by group code, the instance of the query by group code created based upon metadata of a selected condition type,
   generating the generic query structure of an instance of the query by type code, the instance of the query by type code created based upon metadata of a selected condition type, and
   storing the instance of the query by type code and the instance for the query by type code in the memory.

13. The computing device of claim 9 further comprising a control logic coupled to the query controller, the control logic providing logical conditions between one or more user interface elements, the user interface elements comprising the static key and the dynamic key.

14. An article of manufacture comprising, a machine-accessible storage medium that provides instructions that, when executed by a machine, cause the machine to perform operations comprising:
   from a query specifying user interface, receiving a user selection of a condition type for querying a business object associated with the condition type;
   in response to the user selection, identifying an instance of query by group code that is adapted to search for metadata associated with the condition type;
   executing the identified instance of the query by group code to retrieve the metadata associated with the condition type;
   based upon the retrieved metadata, adapting the query specifying user interface to create a query specifying user interface element to query for the objects associated with the condition type, by adding at least one static key and at least one a dynamic key;
   based upon the adapted query specifying user interface element, generating a generic query structure of a query by type code associated with the condition type, the generic query structure including a static field value attribute and a dynamic attribute pair, the dynamic attribute pair having a dynamic field name attribute and a dynamic field value attribute;
   binding the user interface element to the generic query structure of the query by type code, by binding the static key of the user interface element to the static field value attribute of the generic query structure, and binding the dynamic key of the user interface element to the dynamic attribute pair of the generic query structure; and
   passing a value entered in the static value field of the static key to the static field value attribute of the generic query structure, passing a value of the dynamic name field of the dynamic key to the dynamic field name attribute of the generic query structure, passing a value entered in the dynamic value field of the dynamic key to the dynamic value field attribute of the generic query structure, and based upon the values entered in the static key and the dynamic key of the user, building a query for querying the business object.

15. The article of manufacture of claim 14, wherein providing a generic query structure comprises generating an instance of an existing generic query structure.

16. The article of manufacture of claim 14, wherein the generic query structure comprises a group of attribute pairs, attribute pairs are grouped based upon a type of dynamic input field.

17. The article of manufacture of claim 14, wherein the user interface element is bound to the attribute pair based upon a type of dynamic input field.

* * * * *